Oct. 8, 1946.  J. YOLO  2,409,092
SPLICE FROG FOR TEMPORARILY JOINING MOTION PICTURE FILM SECTIONS
Filed Oct. 19, 1944
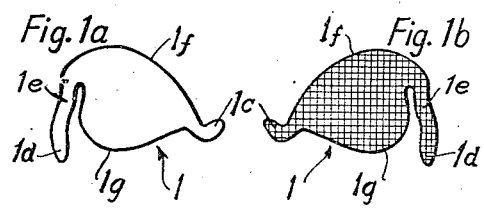
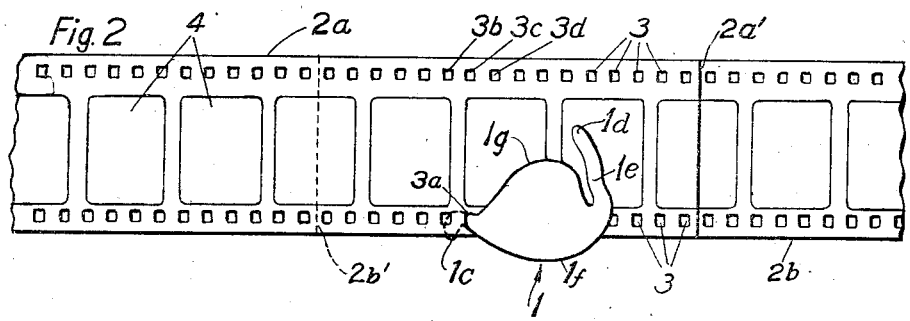
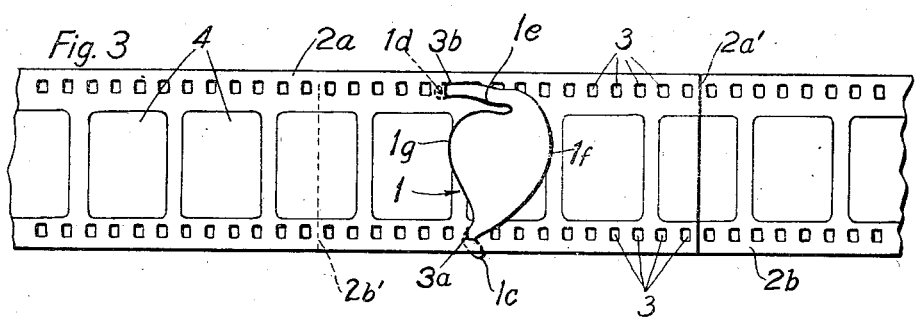
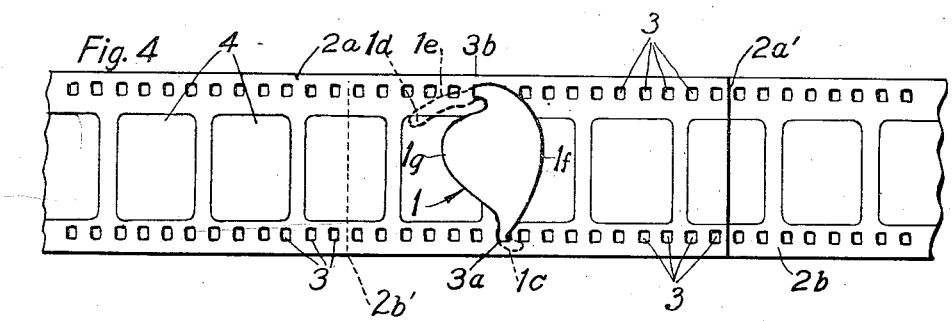
INVENTOR
JOSEPH YOLO
BY
Robert L Rockwell
ATTORNEY Patented Oct. 8, 1946

2,409,092

UNITED STATES PATENT OFFICE 2,409,092

SPLICE FROG FOR TEMPORARILY JOINING MOTION-PICTURE FILM SECTIONS

Joseph Yolo, Yakima, Wash.

Application October 19, 1944, Serial No. 559,470

7 Claims. (Cl. 88—19.5)

This invention relates to mechanical means for temporarily joining different sections of motion picture film in general, and particularly for joining the sections of master negative film being cut to match scenes for the edited work print preparatory to permanent splicing and printing.

Heretofore it has been common practice to make such a temporary connection by means of a well known bent wire paper clip, which is prevented from injuring the film by using a piece of paper that is folded to fit over the lapped film portions under the paper clip and then folded back over both outside portions of the clip to protect other sections of the film as it is wound upon a takeup reel. Such a connection requires considerable care and time to make properly, and is very easily separated.

Great care must be used to avoid damaging the negative from which release prints are made because any scratch, crease or cut on the negative will show on the prints made from it. When the wire clips and folded paper guards are used, as described above, in addition to the danger of scratching the film in making the temporary connection, there also is the danger of the wire clips making objectionable creases in the film if allowed to remain in place too long. Furthermore, the thick wire clips and folded paper guards form objectionable lumps that seriously reduce the footage of film that can be wound upon the takeup reel.

The improvement comprising my invention is characterized by a body and specially formed head and tail, which form what I term a splice frog that may be stamped from any suitable sheet material by means of the well known punch and die press.

An object of my invention is to provide an inexpensive splice frog for temporarily joining lapped motion picture film sections more securely and quickly than has heretofore been done, and without the risk of damaging the film.

Another object is to provide a splice frog of the class described, whereby the lapped motion picture film sections having aligned sprocket wheel apertures are temporarily joined by inserting the head and tail of said splice frog through said aligned apertures.

A further object is to provide a splice frog of the class described having a body portion so related to its head and tail that they coact to cause said head and tail to function as hooks to prevent the separation of the film portions when joined as hereinafter described.

A still further object is to provide a splice frog of the class described having a body portion that is adapted to be grasped between the thumb and forefinger of the user's hand while inserting said head and tail in the aforesaid aligned apertures.

Other objects and advantages will be apparent to those skilled in the art, from the following detailed description of a preferred form of the invention, which consists of certain parts in cooperative combination, hereinafter described, illustrated in the accompanying drawing and embraced in the appended claims.

In the drawing:

Figure 1a is a top plan of the splice frog comprising my invention;

Fig. 1b is a bottom plan view of the same which is cross-hatched to indicate preferably a black color;

Fig. 2 is a plan view of two lapped motion picture film sections having aligned sprocket wheel apertures, with the head of my splice frog inserted into one pair of said aligned apertures, constituting the first step in making a temporary splice;

Fig. 3 is another plan view of the same showing the tail of said splice frog inserted in a nearly transversely opposite pair of said aligned apertures, this being the second step in making said splice;

Fig. 4, likewise, is a plan view of the same showing said splice frog in its final position with the tail fully inserted in said apertures past the enlarged crooked portion to complete the temporary splice.

Like reference numerals are used to indicate like parts throughout the drawing, wherein the splice frog in its entirety is indicated by the numeral 1, and the head, tail, tip and tail crook by the numerals 1c, 1d and 1e, respectively.

Figs. 2 through 4 show top section 2a of the film overlapping bottom section 2b, with their ends at 2a' and 2b', respectively. Frames 4 containing the successive pictures, not shown, preferably are aligned, thereby aligning the two rows of sprocket wheel apertures, which are indicated in general by the numeral 3.

After said apertures have been aligned, the lapped film sections may be held in position by grasping them between the thumb and forefinger by one of the user's hands, while he picks up a splice frog with its light-colored side up by grasping its back 1f between the thumb and forefinger of the other hand.

This enables him to insert head 1c through any convenient pair of aligned apertures, such as 3a near one edge of the film as shown clearly in Fig. 2. The splice frog is then rotated so the tip of the tail 1d may be inserted slant-wise through any one of three such apertures 3b, 3c or 3d near the opposite edge. As shown in Fig. 3, the user has inserted tail tip 1d through aligned apertures 3b. It will be noted that these need not be directly opposite apertures 3a across the film, because of the slight resiliency of the said tail portion. The splicing operation is completed by pushing said tail all the way through apertures 3b past crook 1e near the root of the tail. The film and splice frog then may be released and the spliced film wound upon a take-up reel, not shown.

It will be seen that the head portion 1c of my splice frog is bent or hooked in one direction toward the edge of body portion 1f, and that the tail composed of portions 1d and 1e, in general, is hooked in the opposite direction toward the edge of body portion 1g. This is an important feature of the invention, as hereinafter explained.

After the splice frog has been inserted as illustrated in Fig. 4, body portion 1g so coacts with said tail as to form a hook that prevents film part 2b from being pulled away from part 2a. Likewise body portion 1f coacts with said head so as to prevent film part 2b from being pushed longitudinally with reference to film part 2a. The tail portion past crook 1e preferably is a snug fit in apertures 3b transversely of the film. From the foregoing it will be seen that after the splice frog of my invention is inserted as herein described and illustrated in the drawing, the spliced portions are prevented from separating either longitudinally or transversely, especially after the splice has been wound upon said take-up reel.

The splice frog may be made of any suitable material, but I prefer to use sheet Celluloid which is supplied with a white coating on the top side and a black coating on the bottom side. This material is easily cut by a steel punch and die, not shown, and will not scratch the film. It is desirable that the thickness of this sheet material be comparable to that of the motion picture film to be temporarily spliced.

A right-handed person would insert the splice frog with its white side up, and the dual coloring assists the user in quickly grasping the back so it may be inserted quickly and properly. A left-handed person may prefer to insert the splice frog with its black side up and using his left hand, in which case that color, likewise, assists the user in using it quickly and properly. From the foregoing it will be apparent that the splice frog will function satisfactorily with either side up, but when inserting the splice frog with the left hand I prefer to have the left portion lapped under the right portion of the film, instead of lapped over said right portion as shown in the drawing.

When the user later desires to separate the film sections of the temporary splice for further editing or to make a permanent splice, he graps the lapped portions of the film between thumb and forefinger of one hand, as when preparing to make the temporary splice, then grasps back 1f of the splice frog between the thumb and forefinger of the other hand, withdraws tail portions 1e and 1d from apertures 3b, rotates the splice frog slightly and withdraws head 1c from apertures 3a.

Having illustrated and described a preferred form of my invention, it will be apparent to those skilled in this art that the essential cooperative elemental parts thereof may be shaped and combined in various other equivalent forms, made from other materials and used for other purposes, without departing from the scope of the invention defined in the appended claims. What I claim as new and desire to protect by Letters Patent is:

1. In means for temporarily splicing motion picture film, the combination of a body portion having oppositely disposed edges, a head portion hooked toward one edge of said body portion and a tail portion hooked toward the opposite edge of said body portion.

2. In means, termed a splice frog, for temporarily splicing motion picture film, the combination of a body portion having oppositely disposed edges, a head portion hooked toward one edge of said body portion, and a tail portion in general hooked toward the opposite edge of said body portion, said tail portion being characterized by a crook intermediate of its tip and juncture with said body portion.

3. In a splice frog of the class described, the combination of a body portion having oppositely disposed edges, a head portion hooked toward one edge of said body portion, and a tail portion hooked toward the opposite edge of said body portion and characterized by an enlarged crook near the root of the tail.

4. In a splice frog for temporarily joining lapped motion picture film sections having two rows of aligned sprocket sprocket wheel apertures, the combination of a body portion having oppositely disposed edges, a head portion hooked toward one edge of said body portion and adapted to be inserted through a pair of aligned said apertures of one row, and a tail portion adapted then to be inserted slantwise through a pair of said aligned apertures in the other row by turning said body portion in the general direction toward its other edge.

5. In a splice frog for temporarily joining lapped motion picture film sections having two rows of aligned sprocket wheel apertures, the combination of a body portion having oppositely disposed edges, a head portion adapted to be inserted through a pair of said aligned apertures in one row, and a tail portion hooked toward one edge of said body portion and adapted then to be inserted slantwise through a pair of said aligned apertures in the other row by turning said body portion in the general direction in which said tail portion is pointing.

6. In a splice frog for temporarily joining lapped motion picture film sections having two rows of aligned sprocket wheel apertures, the combination of a body portion having oppositely disposed edges, a head portion adapted to be inserted through a pair of said aligned apertures in one row, and a tail portion hooked toward one edge of said body portion and having an enlarged crook near its root, said tail being adapted then to be inserted slantwise through a pair of said aligned apertures in the other row by turning said body portion in the general direction in which said tail portion is pointing.

7. In a splice frog for temporarily splicing motion picture film having lapped sections with two rows of aligned sprocket wheel apertures, the combination of a body portion having oppositely disposed edges, a head portion hooked toward one edge of said body portion and adapted to be inserted through a pair of aligned said apertures of one row, and a tail portion hooked toward the opposite edge of said body portion and adapted to be inserted slantwise through a pair of said apertures in the other row after said head portion has been so inserted, whereby said head and body portions coact to resist the separation of said lapped film sections in one direction and said tail and body portions coact to resist the separation of the same in the opposite direction period.

JOSEPH YOLO.